(12) United States Patent
Gao (10) Patent No.: US 11,474,543 B2
(45) Date of Patent: Oct. 18, 2022

(54) PRESSURE BALANCE VALVE

(71) Applicant: Robert Gao, Whorton, TX (US)

(72) Inventor: Robert Gao, Whorton, TX (US)

( * ) Notice: Subject to any disclaimer, the term of this patent is extended or adjusted under 35 U.S.C. 154(b) by 507 days.

(21) Appl. No.: 16/554,369

(22) Filed: Aug. 28, 2019

(65) Prior Publication Data

US 2021/0064068 A1 Mar. 4, 2021

(51) Int. Cl.
*B60C 23/00* (2006.01)
*G05D 16/04* (2006.01)
*G01K 1/14* (2021.01)

(52) U.S. Cl.
CPC ....... *G05D 16/0402* (2019.01); *B60C 23/003* (2013.01); *B60C 23/00327* (2020.05); *B60C 23/00354* (2020.05); *G01K 1/14* (2013.01)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009; B60C 23/0425; B60C 2019/004; B60C 23/004; B60C 11/243; B60C 23/00354; B60C 23/045; B60C 23/0464; B60C 23/003; B60C 23/00318; B60C 23/0472; B60C 23/066; B60C 23/00372; B60C 23/0403;

(Continued)

(56) References Cited

U.S. PATENT DOCUMENTS 9,925,835 B1 * 3/2018 Stech ................ B60C 23/00345
10,343,467 B1 * 7/2019 Dooley ............ B60C 23/00345

(Continued)

FOREIGN PATENT DOCUMENTS

| WO | WO-2020198721 A1 * | 10/2020 | ....... B60C 23/00327 |
| WO | WO-2021023828 A1 * | 2/2021 | ........... B60C 23/001 |
| WO | WO-2021030485 A1 * | 2/2021 | |

*Primary Examiner* — Andre J Allen
(74) *Attorney, Agent, or Firm* — Culhane Meadows PLLC; Robert C. Klinger (57) ABSTRACT

An assembly for an ATIS that includes a tire inflation valve and a tire deflation valve, and further includes a safety valve that is configured to receive the tire pressure, deflate a tire when tire pressure is too high such as due to braking heat, road friction, ambient temperature, or other reasons. The safety valve prevents deflation of the tire through the deflation valve in the case of low source pressure, such as the pressure source fails or a leak in the source pressure system lines. The assembly is designed to be quickly serviced in the field, where the serviceable parts are very inexpensive. Multiple devices can be installed in parallel with the others, with one device per tire or tire set. The assembly can be a block configured to be attached to a hub cap of a vehicle. It also enables a sensor placement on the hub cap for hub temperature sensing as well as tire pressures sensing and reporting.

10 Claims, 7 Drawing Sheets

(58) Field of Classification Search
CPC .......... B60C 23/04985; B60C 23/0406; B60C 29/02; B60C 11/00; B60C 23/006; B60C 23/044; B60C 23/00; B60C 23/008; B60C 23/0455; B60C 23/0454; B60C 23/0461; B60C 23/0483; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 23/0422; B60C 23/0423; B60C 23/0466; B60C 2200/02; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06; G05D 16/0613; G05D 16/2024; G05D 16/2053; G05D 19/02; G05D 16/2013
USPC .................................................. 73/146–146.8
See application file for complete search history.

(56) References Cited

U.S. PATENT DOCUMENTS

| | | | | |
|---|---|---|---|---|
| 10,596,862 | B1* | 3/2020 | Cappello | B60C 23/00354 |
| 10,596,864 | B1* | 3/2020 | Berkness | B60C 23/007 |
| 2013/0276902 | A1* | 10/2013 | Medley | B60C 23/00372 |
| | | | | 137/12 |
| 2014/0076456 | A1* | 3/2014 | Kranz | B60C 23/00363 |
| | | | | 152/416 |
| 2015/0174972 | A1* | 6/2015 | Zhou | B60C 23/00345 |
| | | | | 340/447 |
| 2018/0065429 | A1* | 3/2018 | Richardson | F04B 35/01 |
| 2018/0304699 | A1* | 10/2018 | Castriotta | B60C 23/00354 |
| 2020/0130437 | A1* | 4/2020 | Root | G07C 5/0808 |
| 2021/0016615 | A1* | 1/2021 | Richardson | B60C 23/127 |

* cited by examiner

PRESSURE BALANCE VALVE

TECHNICAL FIELD

The present disclosure relates to automatic tire inflation (ATI) systems, including systems for controlling pressure in tires.

BACKGROUND

Automatic tire inflation systems have been commercially available for many years. They are configured to maintain appropriate tire pressure in tires of commercial vehicles, including tractor trailers.

Commercial truck operators have struggled for years to balance the costs of automatic tire inflation (ATI) systems (ATIS) and associated servicing/repair labor and replacement parts with the benefits of the systems. To date, a majority of the commercial truck operators have not adopted ATI systems, in part because the benefits don't outweigh the costs and time. This is primarily due to the maintenance costs including labor and replacement parts, including shipping of parts, associated with maintaining the system over time, which can reach $400 or more present day. Moreover, pulling the trailer for service is a logistical issue.

Maintaining correct air pressure in tires is the dream of operators and many ATI systems. It is significant, not only for the safety, but also for its economical aspects, which include longer tire life span, better fuel efficiency, and reduced if not eliminated down time and repair/maintenance costs.

Starting Jan. 1, 2018, the U.S. Government is implementing fuel credits to truck operators who implement ATI systems, and passive air pressure systems. The ATI systems will receive the larger credits.

An improved ATI system that is affordable, increases safety, and that has an extremely low cost of maintenance, and that even enables others, such as drivers, owner/operators, or other repair persons to service the ATI system, would be highly advantageous to operators to reduce costs, and also to increase the adoption of ATIS in the industry.

SUMMARY

An assembly for an ATI that includes a tire inflation valve and a tire deflation valve, and further includes a safety valve that is configured to receive the tire pressure and prevent deflation of the tire through the deflation valve, when tire pressure is lowered beyond a preset tire pressure range, in the case of low source pressure, such as the pressure source fails or a leak in the source pressure system lines. The assembly is designed to be quickly serviced in the field, where the serviceable parts are very inexpensive. Multiple devices can be installed in parallel with the others, with one device per tire or tire set. The assembly can be a block configured to be attached to a hub cap of a vehicle.

DETAILED DESCRIPTION

This disclosure comprises an inflation/deflation device that keeps the tire pressure in a constant preset range, and also has a safety valve that prevents tire deflation through a deflation valve when there is an undesirable drop in source pressure, and that works with any ATIS system. The device can work on any kind of vehicle, passenger cars, trucks, tractors and trailers to prevent over inflation, with and without an ATIS system. Multiple devices can be installed in parallel with the others, with one device per tire or tire set. This provide pressure balance in all the tires. The assembly can be a rectangular block configured to be attached to a wheel hub of a vehicle.

When the tire is inflated to a preset high-pressure limit, such as 100 pounds per square inch (psi), more inflation or temperature increasing will increase the tire pressure to go beyond this high-pressure limit, typically 110% of cold pressure setting. Once the tire pressure exceeds the high-pressure limit, the device starts deflating the tire and stops deflating when the tire pressure is below the high-pressure limit. The safety valve prevents the deflation valve from working until the safety valve is opened by the tire pressure.

The following description of example embodiments provides information that enables a person skilled in the art to make and use the subject matter set forth in the appended claims, but may omit certain details already well-known in the art. The following detailed description is, therefore, to be taken as illustrative and not limiting.

The example embodiments may also be described herein with reference to spatial relationships between various elements or to the spatial orientation of various elements depicted in the attached drawings. In general, such relationships or orientation assume a frame of reference. However, it should be recognized by those skilled in the art, this frame of reference is merely a descriptive expedient rather than a strict prescription.

Figure 1:
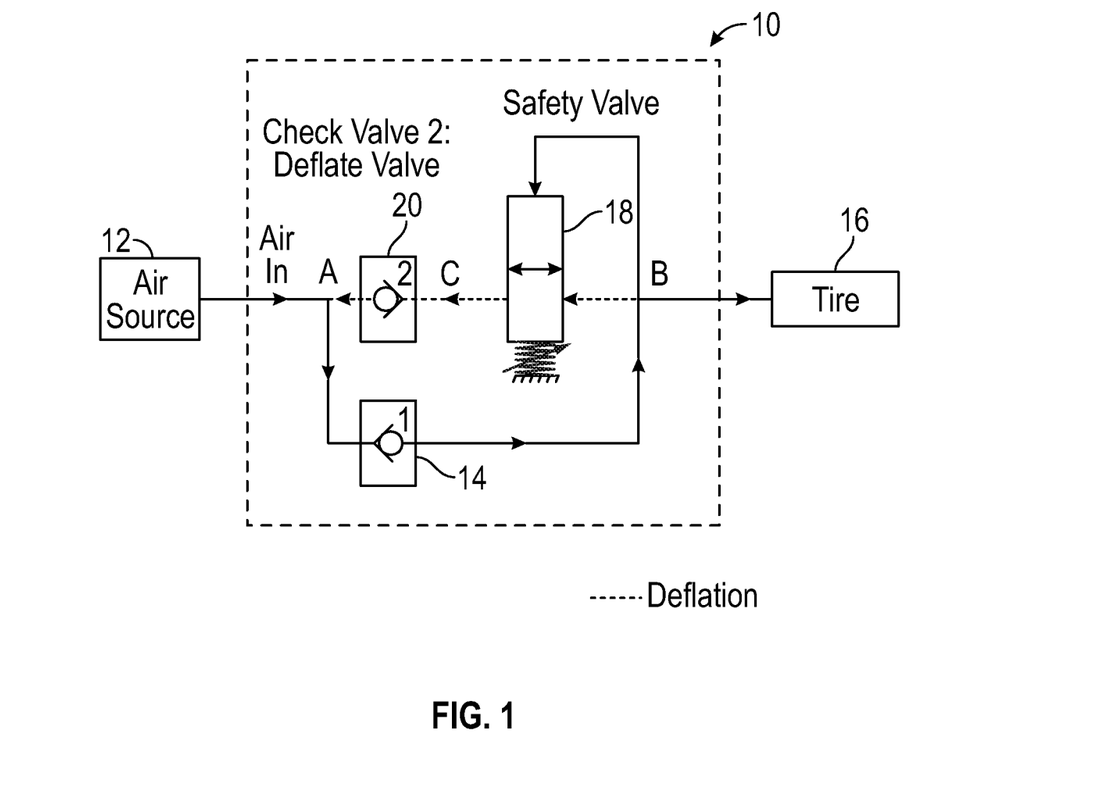
FIG. 1 illustrates a cross-section of the inflation and deflation device.

FIG. 1 illustrates the inflation/deflation device 10 and its operating states. An input of the inflation/deflation device 10 is configured to receive air pressure from air source 12 at node A. An inflation valve 14 is pneumatically coupled to the input receiving the air pressure from air source 12 providing a source pressure, such as 100 psi, to node A, and may be an industrial standard Schrader valve. Inflation valve 14 is open when the source pressure provided to inflation valve 14 at node A is greater than the tire pressure of tire 16 at node B to provide air to tire 16. According to this disclosure, there is also a safety valve 18 pneumatically coupled to tire 16 at node B and configured to open and release tire pressure from tire 16 to a deflation valve 20 at node C when the tire air pressure at node B exceeds a high-pressure limit, such as 110 psi. Safety valve 18 may be a spring biased valve in one example, wherein the spring configured to establish the high-pressure limit. The deflation valve 20 only releases tire pressure from tire 16 when the safety valve 18 is opened. This arrangement is configured to handle certain situations, such as when tire pressure is increased due to beat and temperature increase in tire or air, causing by braking heat, road friction or ambient temperature, and also as a safety measurement to cut off the tire from the ATIS when following situations occur: ATIS malfunction, low air pressure in system, air sources removed for parking, slow air leak, pressure drop in the ATIS systems, and other emergency situations. The inflation valve 14, deflation valve 18 and safety valve 20 are configured to simultaneously allow two-way air flow between node A and node B when each valve is in the open position, meaning that the valves each communicate air therethrough.

FIG. 1 illustrates a cross-section of the inflation and deflation device 10. FIG. 1 shows the design of this device 10 at the state that the associated tire (not shown) is inflated to the designed preset air pressure limit, such as 100 psi, where at this state, all valves 14, 18 and 20 are closed as shown. FIG. 7 illustrates the device 10 coupled to a frame (FIG. 5 and FIG. 6) to form a rectangular rotator attached to a hub cap 11 configured to receive a tire. Further description of such a hub cap 11 is provided in commonly assigned U.S. Pat. No. 9,925,835 where a hub cap is labeled at 12 in this referenced patent, the teachings of which are included herein by reference in its entirety.

Figure 2:
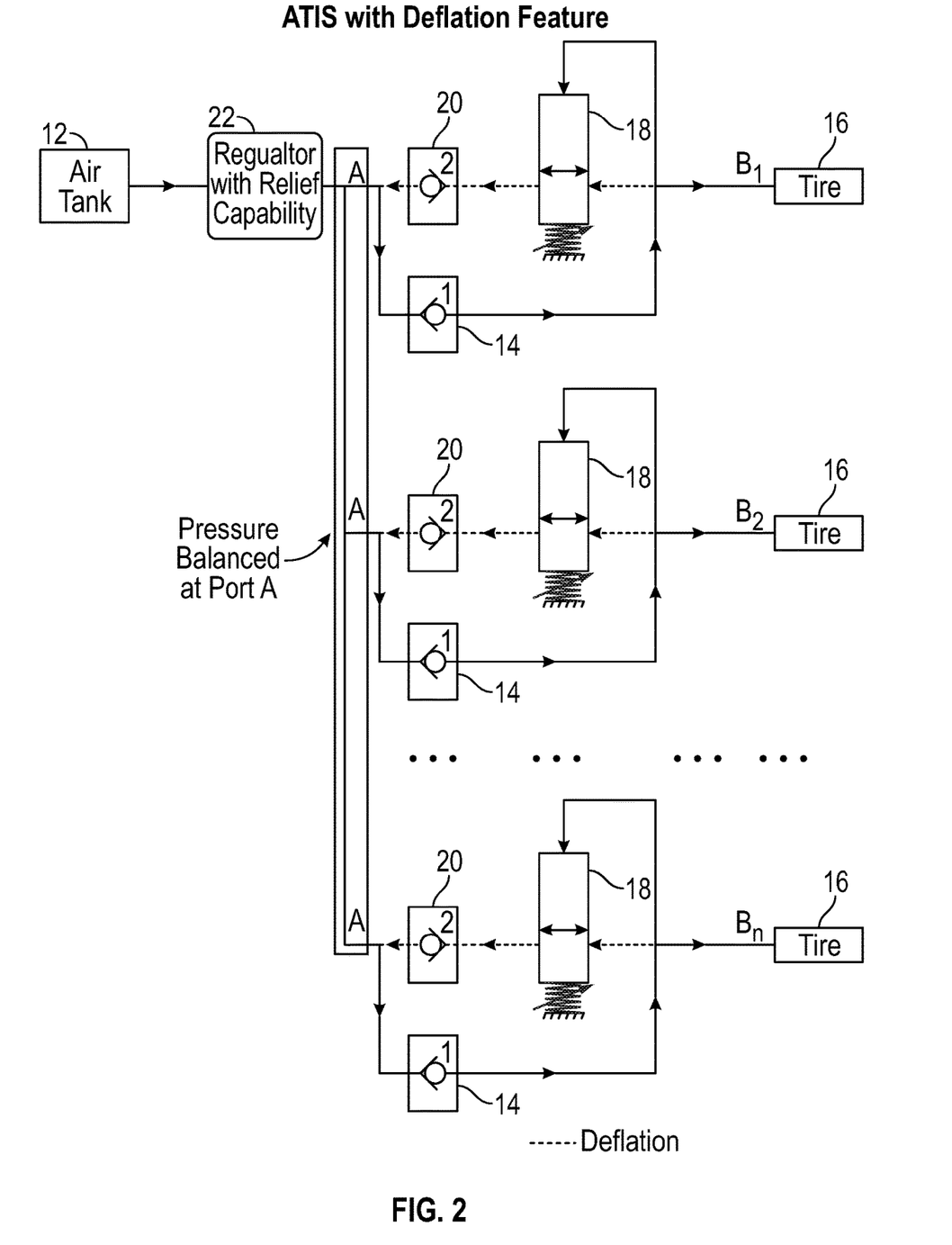
FIG. 2 illustrates several inflation/deflation devices arranged in parallel and receiving the common air source pressure from air source.

FIG. 2 illustrates several inflation/deflation devices 10 arranged in parallel and receiving the common air source pressure from air source 12. Each inflation/deflation device 10 is configured to selectively provide air to an associated respective tire 16 or tire set, and individually provide tire pressure deflation. Collectively, this system of devices 10 provides tire pressure balancing for all tires 16 associated with a vehicle or trailer. A tire pressure regulator 22 with relief capability, or a separate relief valve, can be used between the air source 12 and the node A of inflation/deflation device 10 if desired. The tire pressure regulator 22 provides a balanced source pressure to node A of all inflation/deflation devices 10.

Figure 3:
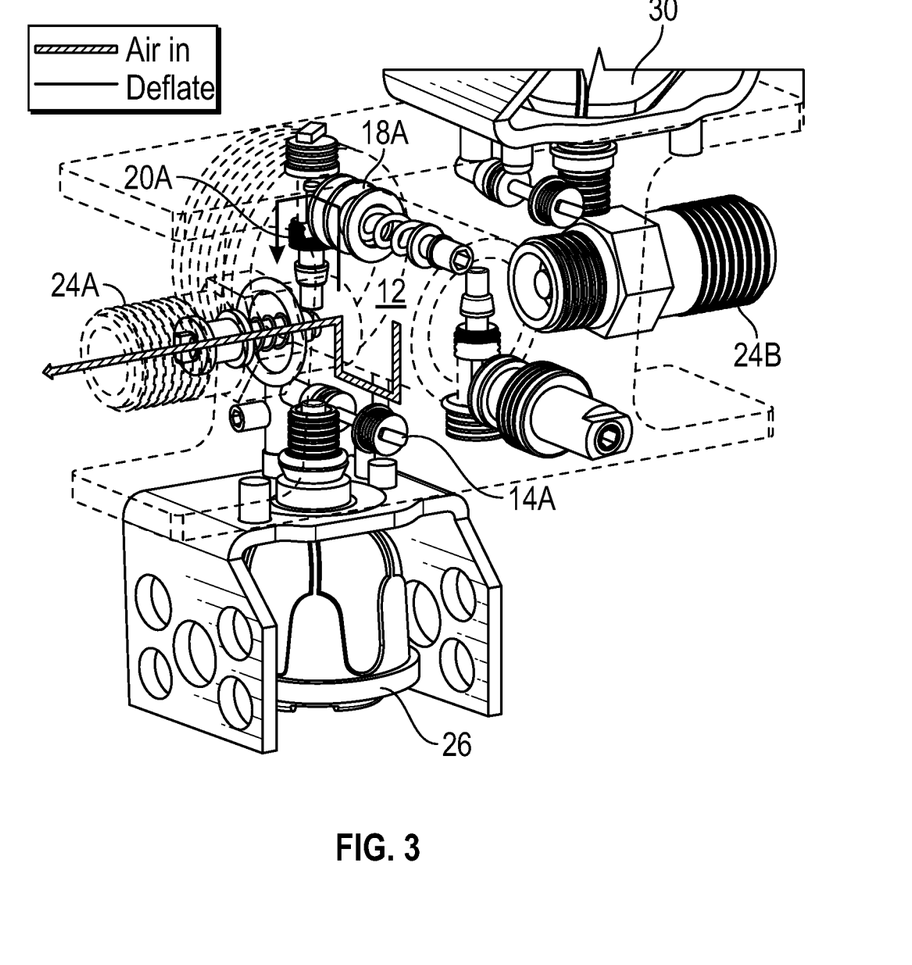
FIG. 3 and FIG. 4 illustrate a perspective view of a first inflation/deflation device coupled between air source and a first port configured to provide air pressure to a respective tire, and a second inflation/deflation device coupled between source and a second port configured to provide air pressure to a respective tire.
Figure 4:
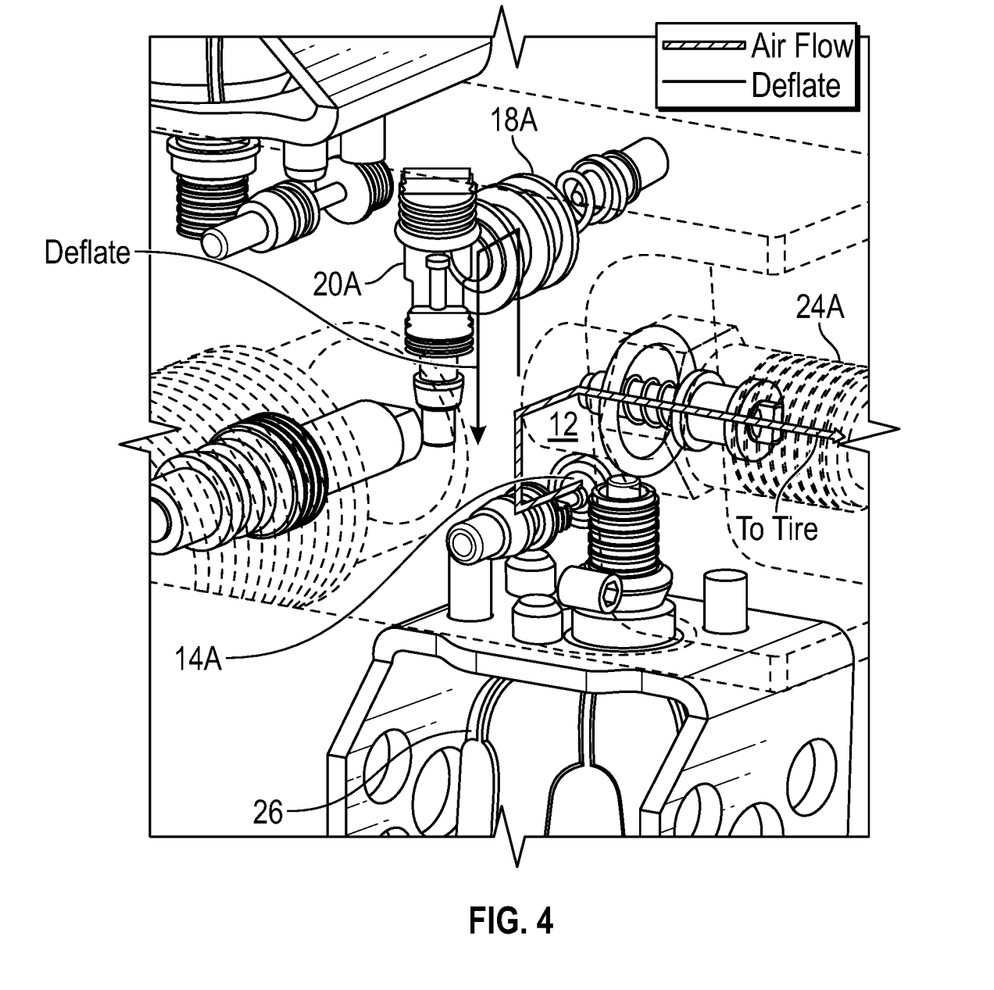

FIG. 3 and FIG. 4 illustrate a perspective view of a first inflation/deflation device 10 coupled between air source 12 and a first port 24A configured to provide air pressure to a respective tire 16A, and a second inflation/deflation device 10 coupled between source 12 and a second port 24B configured to provide air pressure to a respective tire 16B. The source air from air source 12 is coupled to the respective inflation valves 14A and 14B (node A) and the respective ports 24A and 24B (node B) for communication to tires 16A and 16B. The respective safety valves 18A and 18B are coupled between the respective tire 16A and 16B and the respective deflation valves 20A and 20B. The respective safety valves 18A and 18B are open only when the tire pressure of the respective tires 16A and 16B exceed the high-pressure limit. A sensor 26 is configured to sense and transmit tire pressure and temperature at the connection of hub cap 11 and device 10 if desired.

Figure 5:
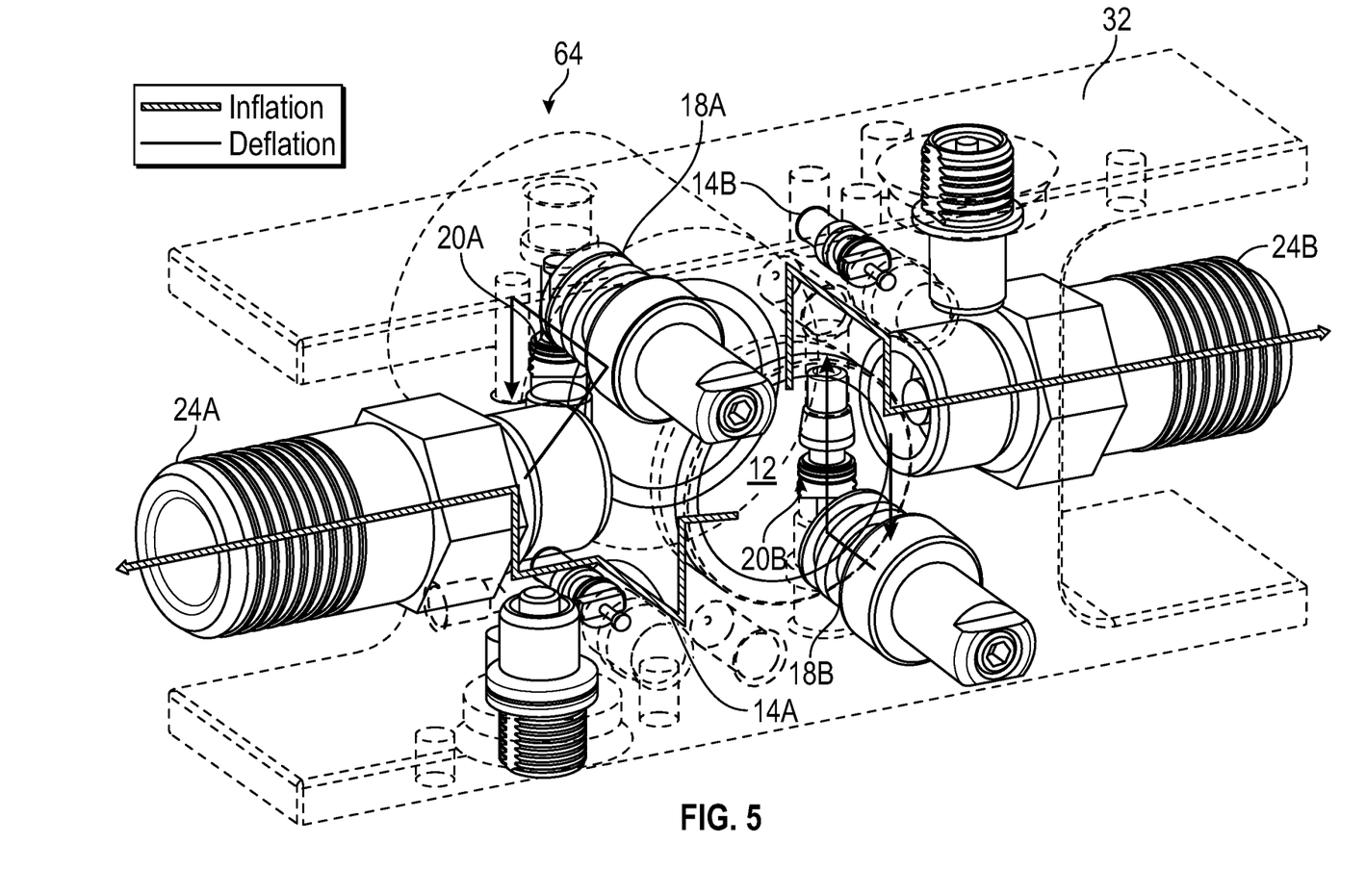
FIG. 5 and FIG. 6 illustrate an example front and back view of a rectangular rotator including inflation/deflation device coupled to a frame.
Figure 6:
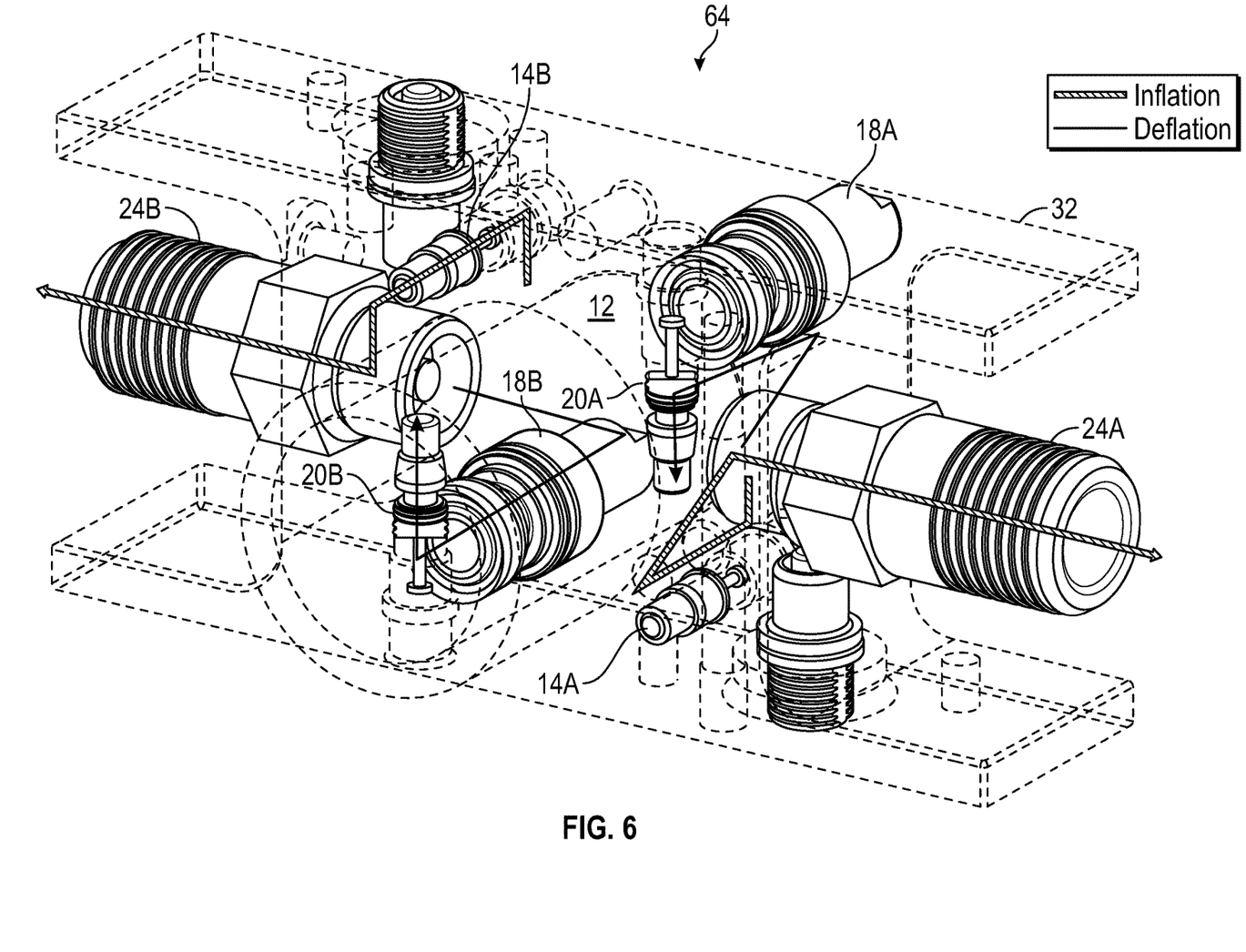
Figure 7:
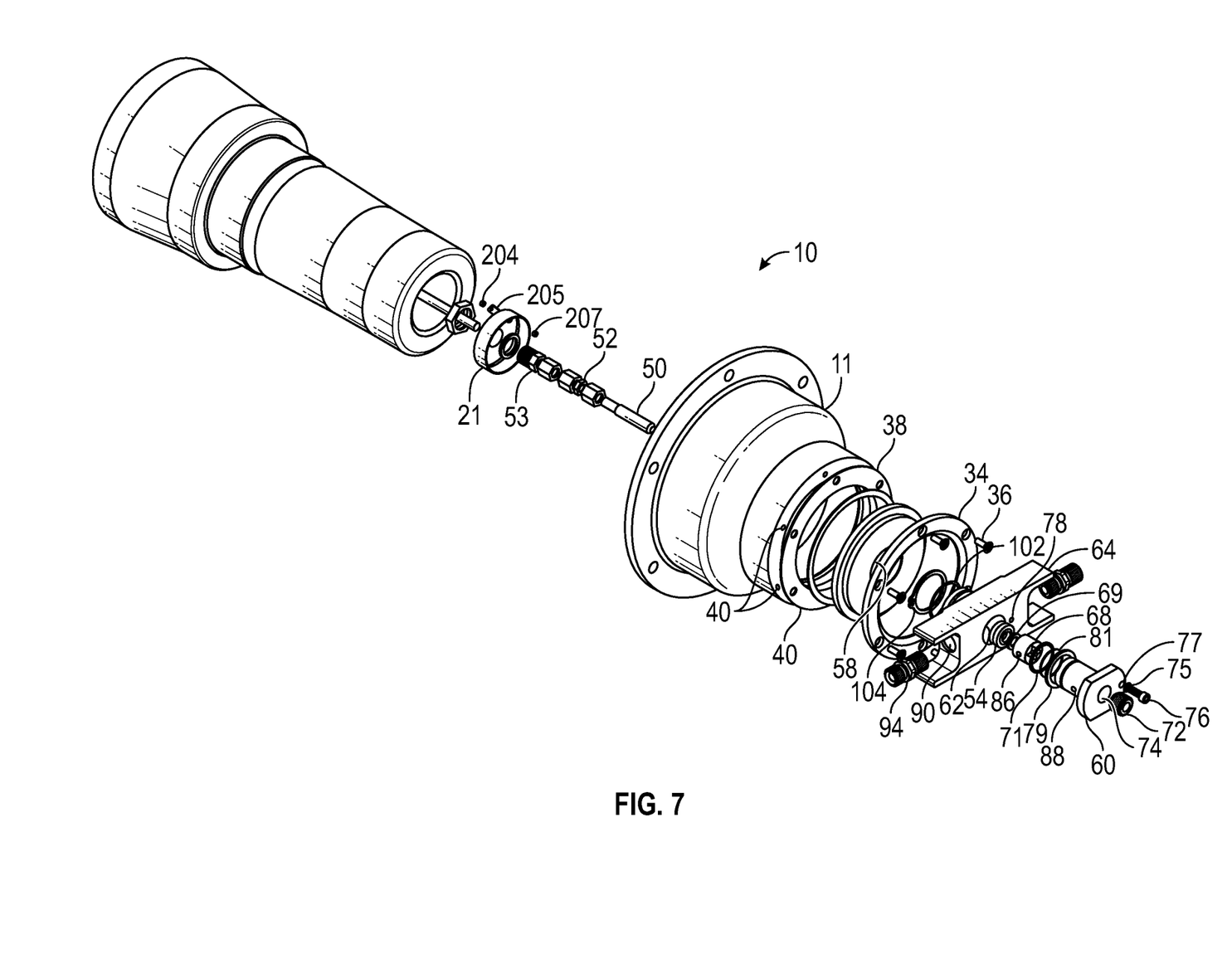
FIG. 7 illustrates the rectangular rotator is configured to be a rotary block configured to be secured to the hub cap.

FIG. 5 and FIG. 6 illustrate an example front and back view of a rectangular rotator 64 including inflation/deflation device 10 coupled to a frame 32, where the rectangular rotator 64 configured to receive air pressure at the input of inflation/deflation device 10 from air source 12. The rotator is not required to be rectangular but is shown as such in this example.

Referring to FIG. 7, the rectangular rotator 64 is configured to be a rotary block configured to be secured to the hub cap 11, where inflation valves 14A and 14B are configured to receive pressure from air source 12 through a shaft 50. Rectangular rotator 64 can be a form-fit substitution for rectangular rotator 64 disclosed in Applicant's U.S. Pat. No. 9,925,835, where shaft 50 provides the air pressure from air source 12, the teachings of which are incorporated in its entirely. All elements shown in FIG. 7 are described in the incorporated 9,925,835, the descriptions are included herein by reference.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described herein may also be combined or replaced by alternative features serving the same, equivalent, or similar purpose without departing from the scope of the invention defined by the appended claims.

The invention claimed is:

1. A device, comprising:
   an input configured to receive air from an air source having an air pressure;
   a first port configured to provide the air from the input to a first tire;
   a first inflation valve coupled between the input and the first port;
   a first deflation valve configured to release air from the first port; and
   a first safety valve coupled between the first port and the first deflation valve, the first safety valve configured to open and communicate air from the first port to the first deflation valve if air pressure at the first port exceeds a high-pressure limit, wherein the first deflation valve is configured to communicate air from the first port only when the first safety valve is open,
   wherein each of the first inflation valve, the first deflation valve, and the first safety valve are configured to be pneumatically controlled by the air pressure at the first port without using electronics.

2. The device as specified in claim 1, further comprising a frame, wherein each of the first port, the first inflation valve, the first deflation valve, and the first safety valve are secured to the frame.

3. The device as specified in claim 2, further comprising:
   a second port configured to provide the air from the input to a second tire;
   a second inflation valve coupled between the input and the second port;
   a second deflation valve configured to release air from the second port; and
   a second safety valve coupled between the second port and the second deflation valve, the second safety valve configured to open and communicate air from the second port to the second deflation valve if air pressure at the second port exceeds the high-pressure limit, wherein the second deflation valve is configured to communicate air from the second port only when the second safety valve is open.

4. The device as specified in claim 3, wherein each of the second port, the second inflation valve, the second deflation valve, and the second safety valve are secured to the frame.

5. The device as specified in claim 2, wherein the device comprises a rotator configured to be secured to a vehicle hub cap, wherein the rotator is configured to receive the air source.

6. The device as specified in claim 4, wherein the device comprises a rotator configured to be secured to a vehicle hub cap, wherein the rotator is configured to receive the air source.

7. The device as specified in claim 2, further comprising a temperature sensor coupled to the frame and configured to report a temperature of the vehicle hub cap.

8. The device as specified in claim 2, further comprising a pressure sensor coupled to the frame and configured to report a pressure of the first tire.

9. The device as specified in claim 1, wherein the first inflation valve, the first deflation valve, and the first safety valve are configurable to allow simultaneous two-way air flow between the input and the first port.

10. A system, comprising:
- an input configured to receive air from an air source having an air pressure;
- a first port configured to provide the air from the input to a first tire;
- a first inflation valve coupled between the input and the first port;
- a first deflation valve configured to release air from the first port;
- a first safety valve coupled between the first port and the first deflation valve, the first safety valve configured to open and communicate air from the first port to the first deflation valve if air pressure at the first port exceeds a high-pressure limit, wherein the first deflation valve is configured to communicate air from the first port only when the first safety valve is open;
- a frame, wherein each of the first port, the first inflation valve, the first deflation valve, and the first safety valve are secured to the frame; and
- a vehicle hub cap, wherein the frame is coupled to the vehicle hub cap, and the input is configured to receive the air via the vehicle hub cap,
- wherein each of the first inflation valve, the first deflation valve, and the first safety valve are configured to be pneumatically controlled by the air pressure at the first port without using electronics.

\* \* \* \* \*